Jan. 12, 1937. J. ERWOOD 2,067,835
PICTURE PROJECTOR
Original Filed June 24, 1935
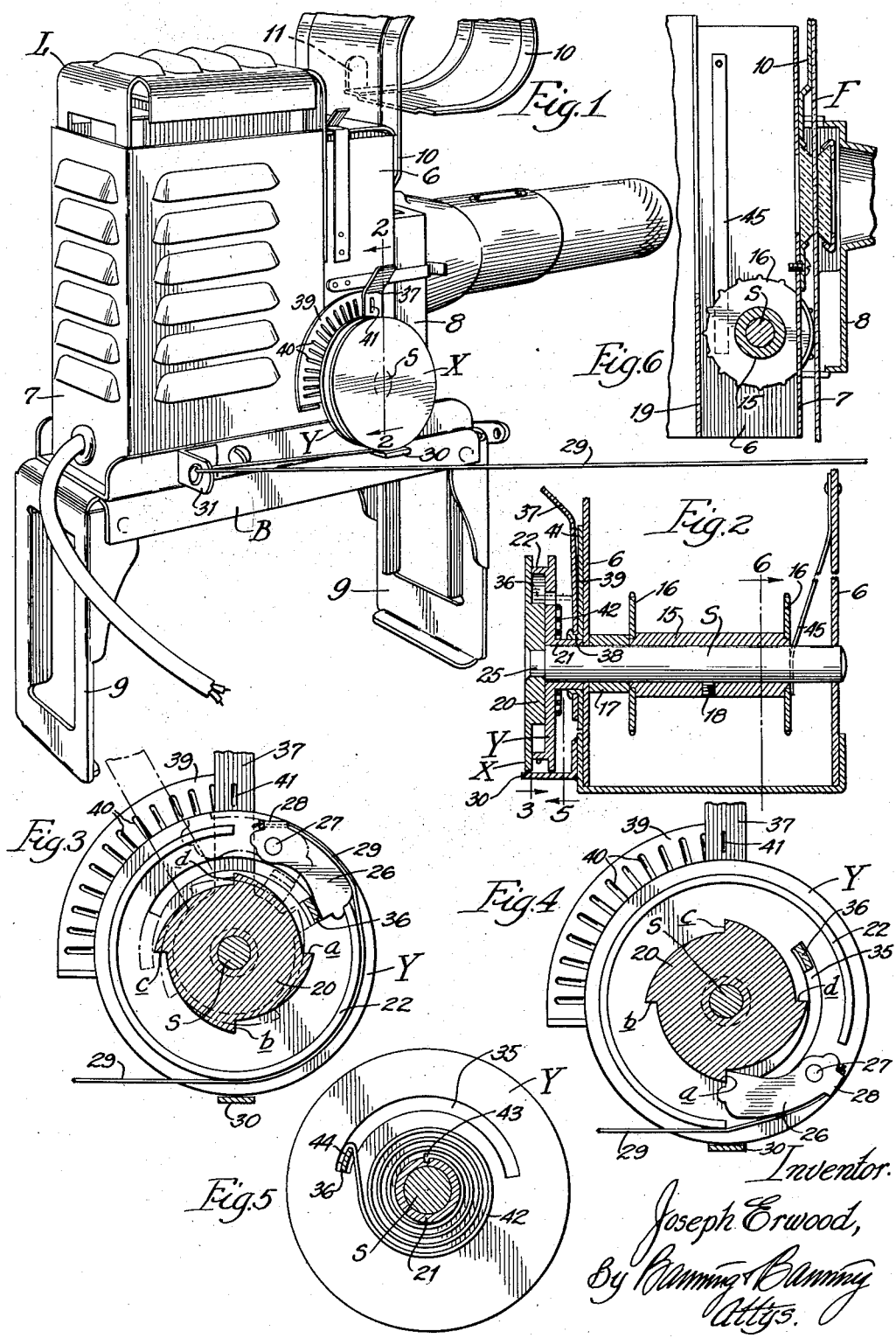

Patented Jan. 12, 1937

2,067,835

UNITED STATES PATENT OFFICE 2,067,835

PICTURE PROJECTOR

Joseph Erwood, Chicago, Ill., assignor to The Webster Company, Chicago, Ill., a corporation of Illinois Original application June 24, 1935, Serial No. 28,047. Divided and this application February 11, 1936, Serial No. 63,393

14 Claims. (Cl. 88—28)

This invention relates to a projector for pictures such as are commonly carried on a transparent medium such as a slide film. More particularly, the present improvements have to do with means for feeding a film and for framing the picture. The subject matter of this invention was first disclosed in my application filed June 24, 1935, under Serial No. 28,047 of which this case is a division.

The means for feeding the film and framing the picture, as herein set forth, comprise a shaft together with other associated parts in concentric relation thereto; a mounting of the shaft and its associated parts within and upon the forward end of the lantern housing; means at one end of the shaft, exteriorly of the housing, for rotating the shaft through a predetermined distance; other means also located near the end of the shaft, exteriorly of the housing, for shifting the position of the movement arc through which the shaft may be rotated; a coil spring having one end attached to the mounting for the shaft and the other end to a part which extends radially of the shaft for returning an actuated element to its initial position; a support for the shaft by opposite side walls of the housing; a spool having spaced end flanges each in the form of a sprocket wheel for engaging with and feeding the film in either direction; a spacer element between one end of the spool and the proximate wall of the housing by which to fix the longitudinal position of the shaft therewithin; an operating connection extended to a distant point whereby to provide for remote control; and the various arrangements and combinations of parts and elements which cooperate together to produce the present mechanism which is of simple and inexpensive character, readily accessible for adjustment or replacement, and certain and dependable in its operation, all as hereinafter described and claimed.

An embodiment of this invention is set forth in the accompanying drawing wherein—

Figure 1 is a view in perspective of a projector lantern equipped with the present mechanism for feeding the film and framing the picture;

Fig. 2 is an enlarged detail in vertical section taken on line 2—2 of Fig. 1;

Fig. 3 is a detail in section on line 3 of Fig. 2, the parts being shown in normal or initial position;

Fig. 4 which is a view similar to Fig. 3 shows the parts moved to final position;

Fig. 5 is a detail in section on line 5 of Fig. 2; and

Fig. 6 is a detail in section on line 6 of Fig. 2.

In Fig. 1 is shown a lantern L comprising a generally rectangular housing with opposite side walls 6 and front and rear walls 7 to the former of which is hinged a gate 8 which mounts on its front a tubular projection containing part of the lens system. As shown, the projector lantern is mounted in its entirety upon a base support B having depending legs 9 for engagement with a suitable bracket (not shown) for resting upon a horizontal surface. Extending upwardly from the forward wall of the lantern is a thin plate which is curved around to form a generally cylindrical enclosure 10 with a stop 11 at one end, adapted to receive a roll of film F which is to be fed through the projector. The film, as it unrolls from its cylindrical mounting, proceeds downwardly behind the gate and along the front wall of the lantern, between guide blocks of glass forming, if desired, part of the lens system.

In the front lower region of the projector lantern I mount a shaft S which extends transversely across the housing through spaced bearings provided by openings in opposed side walls of the housing. A spool 15 having end flanges in the form of sprocket wheels 16 is carried fast on the shaft substantially midway between opposite side walls of the lantern. A spacer 17, here shown as a collar, extends between one end of the spool and the proximate side wall of the lantern whereby to prevent longitudinal movement of the shaft in that direction. The sprocket wheels are joined fast to the spool which, in turn, is connected fast to the shaft by a set-screw 18 so that rotary movement imparted to the one will be transmitted to the other. Behind the spool is a bridge plate 19 extending transversely of the housing and forwardly of the source of light.

The shaft end which is proximate to the spacer collar extends exteriorly of the housing a sufficient distance to receive an operating wheel and other associated parts. As shown, this wheel comprises two disks X and Y of like diameter, having mountings on the shaft which are fast and loose, respectively. The fast disk X is provided with a toothed hub 20 affixed to the shaft adjacent its end and extending toward the loose disk Y which carries an elongated hub 21 which terminates at the outer face of the proximate lantern wall 6. A flange 22 proceeds from one disk toward the other just short of their peripheral edges and cooperates therewith to form a groove around the wheel. According to this construction the fast disk hub 20 serves as an abutment for the loose disk whose hub end bears against the side of the wall 6 opposite to that which is engaged by the spacer collar 17, whereby the shaft is fixed against longitudinal movement, although free to rotate in its bearings in response to any rotary force that may be applied.

The fast disk hub 20, as shown, is provided with four ratchet teeth a, b, c and d, spaced 90 degrees apart, and so disposed as to be engageable by a pawl 26 which is pivotally mounted upon a pin 27 carried by the loose disk Y. This pawl extends in part through a break in the flange 22 so as to lie within the peripheral groove of the operating wheel. At the pawl end close to the pin is a lug 28 having therethrough an aperture for receiving one end of a flexible wire or cord 29 which extends along the back of the pawl and then into the peripheral groove of the operating wheel for travel therearound through a desired distance. As shown, the string leaves the wheel at a low point, passing over a guide lug 30 on its way to an eye 31 through which it continues on to a remote station. The operator at such a station may, by a pull upon the wire or cord, impart to the operating wheel a rotary force which also applies pressure upon the pawl to direct its free end inwardly toward the toothed hub for engagement with the proximate tooth a thereof.

In the disk Y at a point just to the outside of the toothed hub is an arcuate slot 35 extending for a distance somewhat greater than the space between two of the teeth on the hub 20, perhaps 120 degrees or so. Through the slot which lies just to the outside of the toothed hub is extended a finger 36 which proceeds laterally from one side of a setting lever 37 having a rotative mounting upon the hub 38 of a plate 39 which is fixed to the proximate lantern wall 6. This plate is formed with an arcuate area of radial corrugations 40 at a distance from the shaft S in such a position as to be engaged by a rib 41 on the lever 37 whereby to frictionally hold this lever in a desired position of rotative adjustment. A spring 42 (see Fig. 5) having one end 43 hooked to the hub 21 is coiled around through succeeding convolutions to present its other end 44, also of hook form as shown, in engaging relation with the finger 36. Such a spring will occupy but very little space, its several convolutions may all lie in a single plane and in adjacent relation to the proximate face of the disk Y, and its capacity is such that it will exert a rotary influence upon the disk tending to return it always to its normal or initial position which is shown in Fig. 3. Due to the length of the spring, it will not be placed under undue tension, even when the disk is rotated through its full distance.

In operation, the film F is so positioned with relation to the sprocket wheel that the teeth of the latter will lie in edge openings of the former. A pull on the cord or wire will cause the operating wheel to be rotated against the tension of the spring 42. In so doing, pressure will be placed upon the pawl such that it will engage with the first tooth a to lock the two wheel disks together for rotary motion which is thereupon transmitted to the shaft and spool whereby the sprocket wheels are turned a corresponding distance. The initial or starting position is determined by the adjustment of the setting lever 37 whose finger 36 extends into the arcuate slot 35 to successively engage opposite ends thereof (see Fig. 3). The operating wheel in its entirety can rotate no further than the length of the slot, although the outer or fast disk thereof may separately be turned either way as far as desired. The relationship between the two wheel disks and the shaft whereon they are mounted is this: The shaft may rotate, either way, independently of the disk Y when actuated by the outer or fast disk X, but the loose disk Y, operating through the pawl mechanism, may rotate the shaft in one direction only. It is primarily the loose disk Y, plus the pawl mechanism, that constitutes the operating means for the feeding shaft, effective to produce a one-way rotation only.

The conclusion of the operating stroke is reached when the finger engages the opposite end of the arcuate slot. According to the 90 degrees spacing of the ratchet teeth here shown, the rotary movement of the toothed hub and shaft S will be exactly 90 degrees. In this operation the disk Y will be rotated somewhat farther due to extra travel that is required to bring the pawl into engagement with the first tooth. It is important to note that the pawl is held in a position of disengagement relative to the toothed hub, during the first stage of its movement. This is due to interference from the finger 36 always provided at the commencement of operation, regardless of the rotative position of the framing lever. Gravity is, therefore, not a factor in the operation of the pawl whose disengaging and engaging positions are determined by positive forces, i. e., the finger and the pull cord or wire. Upon release of the operating cord, the loose disk Y will be returned to its initial position by the spring 42, leaving the toothed hub advanced for the full distance through which it has been turned. So that the feeding spool may remain in its farthest advanced position, I affix to the inside of the housing a spring arm 45 in engagement with one end of the spool to serve as a brake therefor.

For control of the framing of the picture, the lever 37 may be shifted in either direction. The effect of this is simply to shift the finger 36 to another position where the starting and stopping points for oscillations of the disk are changed. The range of movement remains the same, no matter what may be the adjustment of the passing lever. By applying to the disk X alone a rotary force, the spool shaft may be turned in either direction to frame the picture properly, and this may be followed, if desired, by a further adjustment of the setting lever to maintain the succeeding pictures in such framed adjustment.

The present mechanism is simple and inexpensive in the extreme. It is easily operated and adjusted, and dependable at all times. The assembly of its various elements may be expeditiously performed, the plate 39 with setting lever being first secured in place, the shaft with disks and pawl being next fitted in its bearings and through the spacer collar and spool, and finally the spool being locked upon the shaft as by the set-screw 18. For disassembly a reverse of these operations is followed. Inasmuch as rotary forces are applied to the shaft only at its end which carries the two disks, I have reinforced the proximate shaft bearing by the hub 38 which is extended from the plate 39 to receive the loose disk hub 21.

I claim:
1. In a film projector having a suitable film gate, a film feeding mechanism in which is comprised a rotatable shaft, a pawl mechanism, an oscillatable operating device having a mounting concentric with the shaft and connected with the pawl mechanism, means limiting the movements of the operating device and pawl mechanism to rotate the shaft a desired distance only, and film framing means including the film sprocket having a mounting concentric with the shaft and operable independently of the operating device to rotate the shaft either way to a new rotative position with respect to the pawl mechanism.

2. In a film projector having a suitable film gate, the combination of a light transmitting housing with opposed walls, a shaft extended across the housing and through the opposed walls whereby it is rotatably supported, a film feeding spool on the shaft within the housing, a shaft operating device mounted to oscillate concentrically therewith, a pawl driving connection exteriorly of the housing between the operating device and shaft, and film framing means having a mounting concentric with the shaft and connected to the spool, said means being operable independently of the operating device to rotate the shaft and spool either way to a new rotative position with respect to the pawl mechanism.

3. In a film projector having a suitable film gate and a film feeding sprocket to advance the film through the gate, the combination of a rotatable feeding shaft having operative connection with the sprocket, manually actuated operating means for the shaft mounted concentrically about one end thereof for oscillatory movement, a connection between the operating means and the shaft such that the latter may rotate independently of the former and that the former may rotate the latter in one direction only, a stop for limiting the oscillatory movement of said operating means, and means for adjusting said stop to different concentric rotative positions about the feed shaft to correspond to relative shifted positions of the feed shaft, whereby the proper framing of successive pictures is obtained.

4. Mechanism for feeding and framing a film comprising a shaft, a mounting in which the shaft may be rotated, a feeding spool carried fast on the shaft, a disk having a hub secured fast to one end of the shaft, a second disk having a flange in spaced relation to the hub loosely mounted on the shaft, a pawl pivotally mounted on the loose disk adapted to engage a tooth on the hub of the fast disk, a spring connecting the loose disk with the mounting adapted to urge the disk to an initial position, there being an arcuate slot in the disk last named, a lever having a pivotal mounting adjacent the loose disk provided with an element extending into the arcuate slot to engage with opposite ends thereof whereby to limit its range of movement, and means for securing the lever in an adjusted position.

5. Mechanism for feeding and framing a film comprising a feeding wheel, a shaft on which the wheel is fixedly mounted, a mounting in which the shaft is rotatably carried, a two-disk wheel at one end of the shaft, one disk being fixed to the shaft and the other being freely rotatable thereon, the two disks being in spaced relation, a flange extending from one disk to the other near the peripheries thereof whereby to form a peripheral groove, co-operating elements on the two disks forming a one-way driving connection therebetween such that rotary movement imparted to one will transmit a corresponding one-way movement to the other, means limiting the range of movement of the wheel disk which is free on the shaft, and means for shifting the position of said limiting means.

6. In a film projector having a suitable film gate, a film feeding sprocket adapted to engage the perforations in the film to advance the film through the gate, a spring retracted operating device for the sprocket, means mounting said device for oscillatory movement about the axis of said sprocket, one-way interconnecting means between said operating device and sprocket, a stop for limiting the oscillatory movement of said operating device, and film framing means extending axially through said sprocket and operating device and operable independently of said interconnecting means to rotate said sprocket in either direction.

7. In a film projector having a suitable film gate, a film feeding sprocket adapted to engage the perforations in the film to advance the film through the gate, a spring retracted operating device for the sprocket, means mounting said device for oscillatory movement about the axis of said sprocket, one-way interconnecting means between said operating device and sprocket, a stop for limiting the oscillatory movement of said operating device, a shaft extending axially through said operating device and positively connected to said sprocket for rotation therewith, and a hand wheel on said shaft outwardly of said operating device for rotating said shaft and sprocket in either direction independently of said interconnecting means.

8. In a film projector having a suitable film gate, a film feeding sprocket adapted to engage the perforations in the film to advance the film through the gate, a spring retracted operating device mounted for oscillatory movement about the axis of said sprocket, a pawl carried by said operating device, a ratchet wheel operatively connected to said sprocket in operative association with said pawl, a stop for limiting the oscillatory movement of said operating device, a hand wheel operated shaft extending axially through said operating device and ratchet wheel and connected to said sprocket for rotation therewith independently of said operating means.

9. In a film projector having a suitable film gate, a film feeding sprocket adapted to engage the perforations in the film to advance the film through the gate, a spring retracted operating device mounted for oscillatory movement about the axis of said sprocket, a ratchet wheel operatively connected to said sprocket, a pawl carried by said operating device, means for positively moving said pawl into driving engagement with said ratchet wheel upon operation of said operating device, means for limiting the oscillatory movement of said operating device, film framing means including a hand wheel operated shaft extending axially through said operating device, ratchet wheel and sprocket, and means connecting said shaft to said sprocket for rotating said sprocket in either direction independently of said operating device.

10. In a film projector having a suitable film gate, a film feeding sprocket adapted to engage the perforations in the film to advance the film through the gate, a spring retracted operating device mounted for oscillatory movement about the axis of said sprocket, means providing a one-way driving connection between said operating device and sprocket including a ratchet wheel, a hand wheel operated shaft extending axially through said operating device and ratchet wheel and connected to said sprocket for rotation therewith, and means operable to disconnect said driving connection for free rotation of said sprocket in either direction by said hand wheel operated shaft.

11. In a film slide projector having a rotatably mounted film feeding sprocket, a ratchet disk fixed to said sprocket, a one-way manually actuated operating device for said sprocket mounted for oscillatory movement through a predetermined range about the axis of said disk, a pivoted pawl carried by said operating device for engagement with said disk, and stop means for shifting the operating range of said operating device and pawl about the axis of the disk to correspond to relative shifted positions of the sprocket, whereby the proper framing of successive pictures is obtained.

12. In a film slide projector, a feeding mechanism comprising a rotatable film feeding shaft, a manually actuated oscillatable operating device associated with the shaft, pawl mechanism forming a one-way driving connection between the device and shaft, and means associated with said device and pawl mechanism to limit oscillations thereof within a fixed range, said means being adjustable to different rotative positions relative to the shaft to correspond to relative shifted positions of the shaft, whereby the proper framing of successive pictures is obtained.

13. In a film projector having a suitable film gate, a manually actuated film feeding sprocket adapted to engage the perforations in the film to advance the film through the gate, a spring retracted operating device for the sprocket, means mounting said device for oscillatory movement about the axis of said sprocket, one-way interconnecting means between said operating device and sprocket, film framing means extending axially through said sprocket and operating device and operable independently of said interconnecting means to rotate said sprocket in either direction, and means associated with the operating device to limit oscillations thereof within a fixed range, said means being adjustable to different rotative positions relative to the axis of the sprocket to correspond to relative shifted positions of the sprocket, whereby the proper framing of successive pictures is obtained.

14. A film slide projector having a manually actuated rotatably mounted film feeding sprocket driving shaft, a ratchet disk fixed to said shaft, a one-way pawl operating device for said ratchet disk mounted for oscillatory movement through a fixed range about the axis of said disk, and means for adjusting the fixed range of movement of the operating device to different rotative positions relative to the axis of the disk to correspond to relative shifted positions of the sprocket and disk, whereby proper framing of successive pictures is obtained.

JOSEPH ERWOOD.